(12) United States Patent
Vardon

(10) Patent No.: US 7,300,122 B2
(45) Date of Patent: *Nov. 27, 2007

(54) SHELF FOR SUPPORTING ARTICLES, PARTICULARLY IN REFRIGERATED INSTALLATIONS

(75) Inventor: Francois Vardon, Borgo San Dalmazzo (IT)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,260

(22) Filed: Dec. 14, 2004

(65) Prior Publication Data

US 2005/0088070 A1    Apr. 28, 2005

Related U.S. Application Data

(60) Continuation of application No. 10/644,731, filed on Aug. 21, 2003, which is a division of application No. 10/070,803, filed as application No. PCT/FR02/00482 on Feb. 8, 2002, now abandoned.

(30) Foreign Application Priority Data

Mar. 27, 2001    (FR) ................................... 01 04129

(51) Int. Cl.
 *A47B 96/04* (2006.01)
(52) U.S. Cl. ...................................... 312/408; 108/108
(58) Field of Classification Search ................ 312/408, 312/404, 351; 108/108; 211/153; 248/235
 See application file for complete search history.

(56) References Cited

U.S. PATENT DOCUMENTS

| | | | |
|---|---|---|---|
| 1,981,334 A | 11/1934 | Schmalz | |
| 3,270,404 A | 9/1966 | Andreassen | |
| 3,633,983 A | 1/1972 | Whitcomb | |
| 5,199,276 A | 4/1993 | Sullivan | |
| 5,228,764 A | 7/1993 | Cherry et al. | |
| 5,230,302 A | 7/1993 | Steudler, Jr. | |
| 5,273,354 A | 12/1993 | Herrmann et al. | |
| 5,362,145 A | 11/1994 | Bird et al. | |
| 5,403,084 A | 4/1995 | Kane et al. | |
| 5,429,433 A | 7/1995 | Bird et al. | |
| 5,441,338 A | 8/1995 | Kane et al. | |
| 5,454,638 A * | 10/1995 | Bird et al. .................. | 312/408 |
| 5,524,981 A | 6/1996 | Herrmann et al. | |
| 5,540,493 A | 7/1996 | Kane et al. | |
| 5,564,809 A | 10/1996 | Kane et al. | |
| 5,641,217 A | 6/1997 | Caruso et al. | |
| 5,660,777 A * | 8/1997 | Herrmann et al. .......... | 264/154 |
| 5,705,113 A | 1/1998 | Kane et al. | |

(Continued)

FOREIGN PATENT DOCUMENTS

CH        662 929         11/1987

(Continued)

*Primary Examiner*—Janet M. Wilkens
(74) *Attorney, Agent, or Firm*—Oblon, Spivak, McClelland, Maier & Neustadt, P.C.

(57) ABSTRACT

A shelf, particularly for a refrigerator or the like, including at least one panel and at least one attached plastic structure. The shelf is obtained by shrinking the structure after assembling the panel and the structure. The attached plastic structure can mate and/or exert lateral pressure on the edge of the panel.

7 Claims, 2 Drawing Sheets

U.S. PATENT DOCUMENTS

| | | | |
|---|---|---|---|
| 5,735,589 A | 4/1998 | Herrmann et al. | |
| 5,738,880 A | 4/1998 | Kane et al. | |
| 5,944,324 A | 8/1999 | Schultheis et al. | |
| 6,045,101 A | 4/2000 | Goyette et al. | |
| 6,210,618 B1 * | 4/2001 | Bird et al. | 264/237 |
| 6,422,673 B1 | 7/2002 | Bienick | |
| 6,558,601 B1 * | 5/2003 | Reames et al. | 264/274 |
| 6,679,573 B2 | 1/2004 | Bienick | |
| 6,773,651 B1 * | 8/2004 | Goyette et al. | 264/237 |
| 2006/0162373 A1 * | 7/2006 | McMillin et al. | 62/440 |

FOREIGN PATENT DOCUMENTS

| | | | |
|---|---|---|---|
| DE | 31 41 482 | 5/1983 | |
| EP | 520577 | * | 6/1992 |
| EP | 613766 | * | 2/1994 |
| EP | 0 679 848 | | 11/1994 |
| EP | 0 973 000 | | 1/2000 |
| FR | 2053627 | * | 5/1971 |
| FR | 2 660 740 | | 10/1991 |
| JP | 03070626 | | 3/1991 |
| JP | 11013355 | | 1/1999 |

* cited by examiner

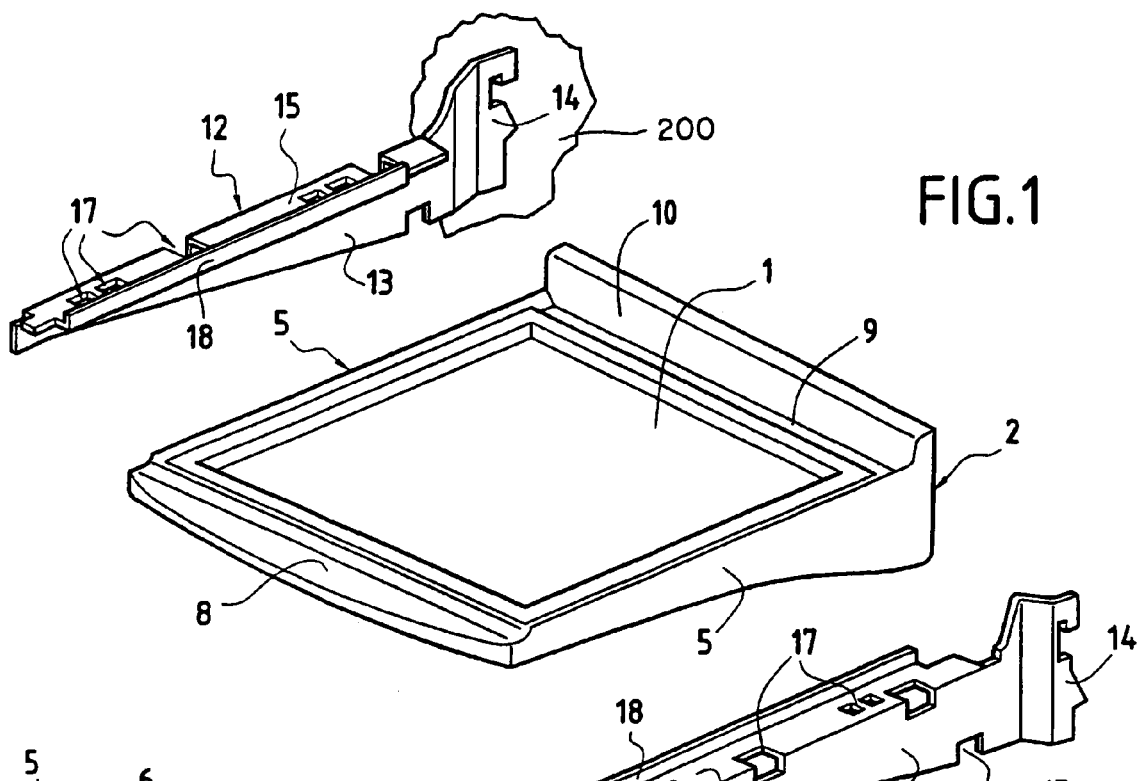
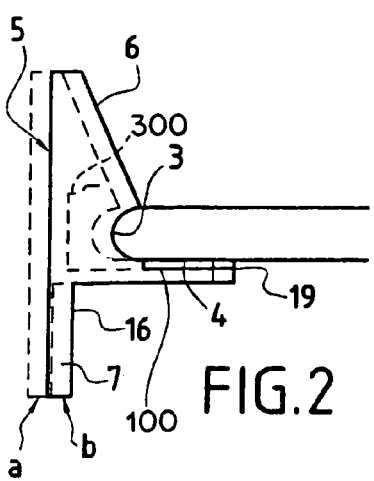
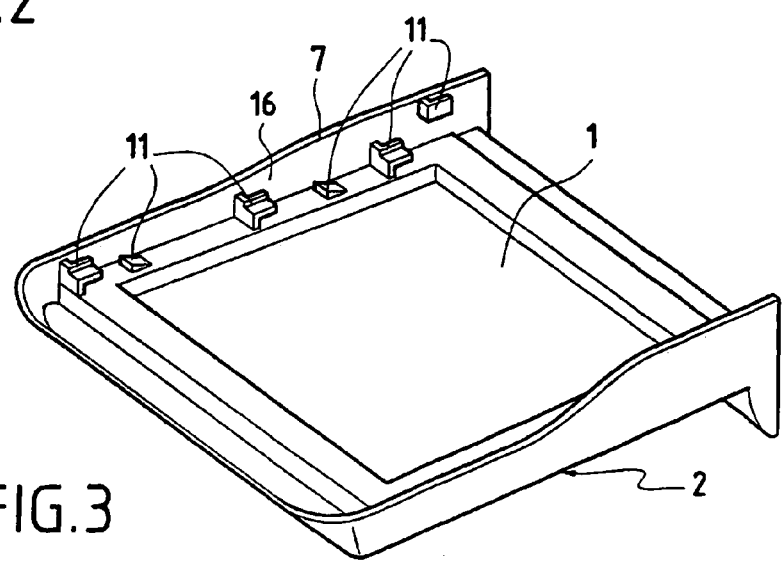

SHELF FOR SUPPORTING ARTICLES, PARTICULARLY IN REFRIGERATED INSTALLATIONS

BACKGROUND OF THE INVENTION

The present invention relates to a shelf for supporting articles and which is intended to be fixed or mounted, in a horizontal or approximately horizontal position, in the chassis of a unit. In particular, it relates to a shelf that can be used in refrigerated compartments (refrigerated cabinets, chillers, refrigerators, etc.) for supporting articles, particularly food.

In domestic refrigerators, it is known practice to use shelves in the form of solid plates made of plastic or glass, such plates being simple to clean, hygienic and able to support all kinds of foodstuffs. These plates are usually equipped with a plastic surround that makes it possible to avoid the risk of injury on the sharp edges of the plates and/or makes it possible to strengthen said plates. Precise and attractive production of this surround making it possible to guarantee a good seal between the surround and the plate consists in injecting the plastic around the periphery of the plate placed in a mold so that it sandwiches (or embraces) the plate, gripping it on its edge and on its top face and underside. This is the "encapsulation" method. The material may also be injected around shelf support elements allowing this shelf to be mounted in the refrigerator. Encapsulation does, however, require specific installations limited to each type of shelf produced, may be complicated, and expensive, it also being possible for the shelves obtained to have disadvantages (limited ability to adapt to various types of structure, etc.).

It is also known practice to form the plastic surround independently of the plate (attached surround) and then for the two to be secured together by bonding (gluing). This method has advantages in terms of simplicity, cost, ease of adaptation, etc., but may pose problems in terms of the robustness or longevity of the assembly and/or of appearance and/or of sealing.

SUMMARY OF THE INVENTION

The object of the present invention is to provide shelves which are improved with respect to the existing shelves as previously described. This objective is achieved by virtue of the shelf according to the invention. This shelf comprises at least one panel intended to take (receive) the articles, and at least one attached (or "added") plastic structure (or surround) mating with (or fitting or following or hugging) the edge of the panel and/or exerting lateral pressure on the edge of the panel (for example holding the panel by compression of its edge or exerting radial pressure on the panel). According to one particularly advantageous embodiment, this adaptation to the contours of the panel and/or this compression are obtained by shrinking the plastic (or the plastic structure) as explained later on.

The panel (or plate or sheet) of the shelf according to the invention is generally rectangular, rigid, has an approximately flat surface for supporting articles (top face, in the position of use) and is not very thick with respect to its area. It is generally formed as a single piece (monolithic) but may also be more complex (in the form, for example, of a laminated structure comprising several sheets of glass and/or of plastic and/or of other materials). It may be opaque or translucent but is preferably at least partially transparent, for esthetic and practical purposes; it may also be equipped with functional or decorative layer(s) or pattern(s) (for example in enamel or ink) on one or more of its faces.

The panel may for example be made of glass, polycarbonate and/or polymethyl methacrylate. As a preference, it at least comprises or is in the form of a sheet of glass, a material which is advantageous in terms of hygiene, rigidity, longevity, etc. For safety reasons, this glass is generally toughened, particularly in the case of a monolithic panel. The panel is usually solid, but may also comprise one or more reliefs and/or recesses and/or holes (for example for air circulation) and/or may have undergone one or more surface treatments such as sandblasting, striations, etc.

The plastic structure (or plastic support or surround) allows the panel to be supported and coats its sharp edges for more comfortable and safe handling of the shelf. In general, it is in the form of a frame, this frame offering one or more supporting surfaces (or bearing surface or base) for supporting the panel, these supporting surfaces, which are horizontal or approximately horizontal in the position of use, delimiting a region the dimensions of which correspond approximately to the dimensions of the underside of the panel. These supporting surfaces may, for example, be in the form of small tongues or lugs (or studs) projecting from the frame, on the underside in the position of use and around the central opening of the frame in which the panel is to be placed; this may also be a continuous supporting surface in the form of a frame supporting the panel at its periphery or alternatively, the plastic structure may also be solid and support the panel over its entire underside, or may support the panel at points other than on its periphery.

The plastic structure may have a small thickness (barely exceeding that of the panel) or a greater thickness, for example over certain parts of its periphery, with one or more walls on one and/or other of the sides rising up above the plane of the panel and/or protruding underneath below the plane of the panel (considering the shelf in its position of use).

The plastic structure generally borders the panel around its entire periphery, particularly on its edge (or, to put it in an equivalent way, its thickness or its edges if considering each of the sides separately) and possibly over at least part of at least one of the top face and underside of the panel (for example it may cover the top face around all or part of its periphery over a width of a few millimeters and have parts which protrude slightly on the underside to support the panel, or it may not cover the top face of the panel and simply cover part or even all of its underside). Furthermore the walls may border just part of the edge (or edges), it being possible for example for a wall to have openings over part of the edge at least along one of the sides.

The edges or walls of the plastic structure may be straight and uniform or of a more complex shape, in particular may have peripheral parts or extensions for functional or esthetic purposes. For example, the structure may have an extension forming a handle on its front edge (or along one side of the shelf intended to remain free) and/or may have an upstand, for example along its rear edge, acting in particular as a stop to prevent products placed on the shelf from coming into contact with the wall of a refrigerated unit containing it and/or may have side walls or lateral extensions extended, as appropriate, by projecting fins or lugs or studs or projections, and capable of sliding between rails or on supports formed in the lateral walls of a unit, etc. Reinforcing elements, fasteners, etc. may also be attached (added) or provided in the plastic structure, such as metal assembly elements (as explained later on), or reinforcing ribs or attachment means, etc. It is also possible to provide at least one channel, for collecting liquids if need be, or along which liquids can flow.

In one embodiment, the plastic structure may have or may collaborate with lighting means (preferably low voltage). For example, a light may be situated in a housing provided in the plastic structure. One surface (for example the underside) of the panel may be treated or machined, for example sandblasted or grooved, to amplify this illumination effect by refracting the beam of light emitted by a light source. The electrical power supply for lighting the light may be associated with the opening of the door of the container in which the shelf is positioned or may be associated with the operation of a special push-button switch.

The plastic structure is, according to the definition given above, an attached part, that is to say one not formed directly on the panel but formed separately (or preformed) before being assembled with the panel. This structure requires equipment which is not as expensive as in the case of shelves formed by encapsulation, is simpler and offers greater flexibility.

In the shelf according to the invention, the plastic structure mates with (or fits) the edge of the panel and/or exerts lateral pressure on its edge. This may be all of the edges as seen earlier or possibly part of the edges. Advantageously, the plastic structure mates with at least two opposing edge parts (for example part of each of the lateral sides) and preferably at least two sides facing each other along their entire length and, as a particular preference, mates with at least part of the edges along all the sides of the shelf (front, lateral, rear sides). Advantageously, the structure mates with the panel around its entire circumference. It also mates with the panel over at least part of its height (or thickness), or even over its entire height.

This adaptation to the contours of the panel is advantageously obtained by shrinking the plastic. Alternatively or in addition, it may be obtained by using a plastic structure formed of at least two plastics ("two-material structure"), one of which is more flexible and intended to be in contact with the panel (particularly in contact with the edge of the panel) and best mates to its shape, this more flexible material partly, and perhaps fully, covering the other more rigid material (which provides the structure with integrity).

As an alternative to or at the same time as the adaptation to the contours of the panel, the plastic structure also presses the edge of the panel (or exerts radial pressure on the panel). The plastic structure holds (or retains) the panel by compression of its edges (at least in part, particularly at least part of the two opposing sides), which gives the association better rigidity and longevity. This pressure may be obtained mechanically by force-fitting (that is to say exerted by forcing) and/or may be obtained advantageously by shrinking the plastic, as explained below. In the preferred embodiment where it is obtained by shrinking the plastic structure, the force compressing the structure onto the edge of the glass is generally of the order of a few MPa, preferably at least 5 Mpa, and does not exceed 15 MPa, for example is of the order of 8 to 10 MPa.

As indicated previously, precise adaptation to the contours of the panel and retention by radial compression are preferably obtained by shrinking the plastic (the shelf according to the invention in this case being rather more defined in that the panel is secured to the structure by shrinking the structure (or the plastic of said structure)). Note that more generally and independently of the above definition, the present invention also covers, by way of a shelf, any shelf, particularly for a refrigerator or the like, comprising at least one panel and at least one attached plastic structure, the shelf being obtained by shrinking the structure, even if this shrinkage is not enough to result in exact adaptation to the contours of the panel. In this case, additional means may be used to secure the panel and the plastic structure, such as clipping (fitting together, for example, as necessary, using tabs or lugs forming the supporting surfaces) and/or bonding (gluing), as explained later on.

Depending on the plastic or plastics used to form the plastic structure, shrinkage may be performed by cooling and possibly by changing the state of the plastic (for example changing to the semicrystalline state with internal reorganization of the material) and occurs to a more or less important extent. The desired shrinkage is generally at least 0.25% (with respect to the width and/or the length) of the structure and advantageously at least 0.5% and does not exceed 2% (advantageously does not exceed 1.5% or even, as the case may be, 1.2%) of said width (and/or length) so as to avoid visible deformation of the walls and a deterioration or unattractive appearance of the assembly.

The advantages of this shrinkage and of the shelf defined previously are many: there is no need to machine the sides of the panel and of the parts of the structure to allow better connection, the plastic structure as necessary compensates for the tolerances on the panel (that is to say corrects dimensional variations of the plates relative to the mechanical manufacture of said plates) and gives a better appearance or better seal at the panel/structure join; in addition, aside from an economic advantage over the shelves obtained by encapsulation, the shelf according to the invention is also more practical, it being possible for the useful area for supporting objects to be greater, the plastic not necessarily covering part of the top face of the panel (or conversely of the underside, hence saving on plastic). The shelf is also simpler to manufacture and offers greater possibility of adaptation to existing structures. It also has particularly satisfactory rigidity and longevity.

The present invention also relates to a method for obtaining the shelf whereby the plastic structure is formed separately from the panel by hot molding (in the hot state or under heat), the panel being assembled with the plastic structure after molding before the plastic has fully shrunk.

The structure may be molded for example by injecting a plastic, previously heated and melted, into a closed mold or an injection-molding machine (or press), the plastic being, for example and advantageously, polypropylene, possibly filled with talc to improve its mechanical robustness, or acrylonitrile-butadiene-styrene (ABS), etc., the plastic being chosen according to the characteristics, particularly strength, desired for the structure, but also according to its ability to shrink as required in the invention. Once molded, the material cools and solidifies, first in the mold (or press) to give a semi-finished product which can be removed from the mold without losing its overall shape, then out of the mold, the shrinkage phenomenon occurring especially after the mold has been opened and all the more so after extraction from the mold (the dimensions reducing but the shape remaining more or less the same).

Advantageously, the panel is assembled with the plastic structure after (or "just" after) the mold has been opened (or after it leaves the press) and preferably outside the mold, preferably before shrinkage reaches 40% (and preferably 30%) of the total shrinkage. In practice, this assembly often occurs in the 10 minutes, and preferably in the 4 minutes, following the opening of the mold (or the press), it being possible for the plastic to continue to shrink thereafter for several hours, but to an increasingly limited extent.

In the case of intermediate treatment, such as the deposition of an adhesive on the structure (as explained hereinafter) between molding and assembly, and in order to avoid excessive or excessively fast shrinkage of the plastic, it is also possible to envisage holding the structure at a temperature as it leaves the mold or press (for example holding the structure at a temperature of the order of 60° C. in the case of polypropylene), for example by providing a temperature maintaining (soak) tunnel on the manufacturing line.

The shrinkage of the plastic allows better adaptation to the contours of the panel but may not be enough to guarantee the longevity of the assembly (there may still be some clearance at certain points along the interface between the structure and the panel or insufficient radial compression to hold the panel). In this case in particular, the integrity of the assembly in terms of mechanical strength and/or sealing may be ensured jointly or alternatively by other means such as clipping and/or gluing. For example, tabs or tongues or lugs may be provided on the structure to hold the panel by clipping, the panel then being inserted, generally by force, between the tabs or tongues or lugs and the remainder of the structure before the structure has fully shrunk. In an advantageous mode of assembly, the tabs or tongues or lugs are on the underside of the structure and also act as supporting surface for the panel, the panel being inserted (generally by force) from the side of the structure that constitutes the underside of the shelf in the position of use (the structure in this case possibly being inverted during assembly or possibly leaving the mold in an inverted position). This method of assembly on the underside may also be used with advantages independently of the shrinkage of the structure.

As a preference, prior to assembly and generally after opening the mold (except perhaps in the case of two-(shot) injection molding deposition as mentioned later on), adhesives) is(are) also deposited over at least part of the structure that is to be in contact with the panel (part of the supporting surface and/or possibly on parts of the structure which are to be in contact with the edge) so as to further improve the seal and adhesion between the structure and the panel. This is preferably an adhesive of the elastic (or viscoelastic or soft) type, for example of the polyurethane type, making it possible to compensate for the respective expansions of the panel and of the plastic which are due to temperature changes in transport or in use (there being a risk that a "hard" adhesive would break in shear or become detached during temperature changes). The shelf according to the invention may thus comprise, aside from the plastic structure and the panel, an adhesive, preferably deposited around the periphery of the structure (in the form for example of flexible bead which is squashed when the panel and the structure are associated).

Note that in the embodiment where assembly is achieved by using shrinkage, clipping and adhesive bonding at the same time, the structure generally, as (or after) it leaves the mold and after possible transfer through a temperature maintaining tunnel, is equipped with adhesive at the appropriate points before the clipping of the panel and the complete shrinkage of the plastic.

As mentioned previously, the plastic structure may also be formed of at least two plastics (two-material structure), one of which is more flexible, and covers the other which is more rigid, and is intended to be in contact with the panel so as to better mate with its shape, the flexible material being squashed when the panel and the structure are associated (in the cold state from the formed structure and the panel, or in the hot state as in the method described previously) for better contact and better sealing between the panel and the plastic structure. This two-material plastic structure may be produced by two-injection molding (injecting the different materials in the same mold, generally one after the other).

As an alternative to the adhesive and/or to the makeup of the plastic structure, or in addition, it is possible to use one or more insulating beads or gaskets, self-adhesive or not, which may or may not be in the form of foam (or of a hot melt adhesive blown with air bubbles): it is also possible to give the gasket or bead of adhesive deposited a special shape (for example conical) for better contact when the gasket or the adhesive is squashed mechanically between the panel and the plastic structure. The surface of the panel may have been treated beforehand (at least in part) for example by sandblasting, so as to improve its grip (hold, key) for adhesive, and/or the plastic structure, after the opening of the mold and prior to the application of adhesive may have undergone a surface treatment (on the parts intended to receive the adhesive) such as goffering (formation of striation) or the formation of roughness or a plasma treatment (by spraying an ionized gas or projecting a flame over the plastic surface) to increase the area of contact between the plastic and the adhesive and/or to create other points of attachment, or may alternatively have been equipped with a groove to accommodate the gasket or the adhesive.

As previously mentioned, assembly may be on the underside of the structure; it may also be on the top side, the top side of the panel remaining uncovered or being inserted in clips or protruding parts. In the. absence of such protruding parts, the shrinkage of the plastic or an additional heat treatment may also cause the appearance of a small bulge which presses against the top face of the panel (in the position of use) and, as appropriate, on the gasket and/or the adhesive and/or the flexible material of the plastic structure So as to provide additional sealing. Possibly, and depending on the plastic used, the shelf may also be obtained simply after an additional heat treatment of the plastic structure (reheating) subsequent to the molding of said structure, the panel being assembled with the structure after this additional heat treatment, an adhesive and/or a surface treatment possibly being deposited or performed prior to assembly.

As an alternative or in addition to the shrinkage of the plastic structure, it is also possible to produce the plastic structure by a technique known as "air molding" (or injection of plastic assisted by gas), this technique making it possible to obtain a shelf which has good robustness and rigidity with less material than conventional molding. This technique consists in introducing a pressurized inert gas (for example nitrogen) into the molten plastic during molding after the partial filling of the mold cavity so as to create, within the molded part, regions of greater thickness and empty regions. Air molding makes it possible, for example, to create reinforcements (extra thicknesses, ribs, etc.) along the sides of the plastic structure and possibly lateral support arms in the very body of the plastic structure. This technique also allows more rapid cooling of the molded part and shorter production cycles, and makes it possible to obtain a particularly satisfactory surface finish.

To suit certain uses of the shelf according to the invention, the invention also proposes elements for assembling (or mounting) the shelf in units (for example for cantilever mountings), these assembly elements being fixed by clipping (or catching, in particular being fixed mechanically by imbrication means such as recesses and/or protrusions, teeth, lugs, studs) onto the plastic structure of the shelf (more precisely underneath as a general rule) and advantageously having at least three parts. These elements are initially (each) in the form of a leaf (or fin or platelet), generally made of metal, and bent (for example by stamping) so that it has an approximately L-shaped cross section with at least one leg of the L (or first part of the element) intended to be clipped, under the panel, against a vertical wall of the plastic structure protruding from the underside of the panel and at least one part (second part of the element) of the other leg of the L intended to be clipped under the supporting surface of the plastic structure. These elements also initially have, at one of their (longitudinal) ends, a hook for the possible cantilever mounting of the shelf in a unit. The third part is formed by the end of a leg; depending on the mounting method envisaged, this end is either bent so that it rims (borders) another part of the shelf, particularly the plastic structure (the three parts therefore in this case holding the shelf in three directions, providing better stability and better robustness for the assembly), or fashioned to form a runner (or sliding channel) intended to collaborate with additional cantilever-mounted means for catching onto the unit (to form a sliding shelf), these additional means (for example in the form of a metal frame collaborating with the assembly elements) in this case being caught by hooks onto the unit, it then being possible for the hooks of the assembly elements to be removed by cutting them off. The adaptation of the third part of the assembly elements and the possible cutting-off of the hook may advantageously be done at the last moment depending on the type of attachment required. It is thus possible to use the same shelf for all types of attachment (for example without the assembly elements for a shelf held on the side walls of the unit, or with the assembly elements for a cantilever attachment, whether this be in fixed or sliding mode). Note that the assembly elements described previously are also advantageous for any type of shelf other than the one of the invention.

The assembly elements previously described may, as the case may be, be considered independently of the shelf or as forming part of it and may be fixed definitively or detachably to the shelf. They guarantee not only the securing of the shelf to the wall but may also contribute to reinforcing the shelf. In general, at least two assembly elements are needed for mounting the shelf in a unit when the shelf is to be mounted cantilever fashion, these elements generally being fixed to the lateral sides of the shelves. As indicated previously, these elements may also slide on a frame fixed to the unit, this frame or runner advantageously being formed as a single piece (for example by stamping) for better strength and generally being made of metal. In this case and advantageously, sliding is between the assembly elements acting as intermediate elements and the additional support frame, and not directly between a support frame and the plastic structure.

As indicated previously, when the shelf is intended to be fixed cantilever fashion to the rear wall of the unit, the shelf has at least two parts projecting from its rear side (originating from the assembly elements when the shelf is intended to be mounted fixedly or from the additional frame when the shelf is intended to be mounted so that it can slide), which act as hooks or teeth to engage with (and be retained in) rungs or holes in rails fixed to the rear wall of the unit so that the shelf cantilevers forward from said wall.

The shelf can also be fixed on the side walls of a container or may rest or slide, via its plastic structure, on supporting or guiding surfaces placed on the lateral sides of the container and without the need for the previously mentioned assembly elements.

The shelf is usually mounted detachably and/or slidably on at least one wall of the unit or refrigerator. In one embodiment, the shelf or the assembly elements or the additional frame may also have or collaborate with anti-withdrawal safety devices intended to prevent the shelf from coming out, for example, of the rails to which it is fixed or on which it slides.

It is also possible to mount other types of assembly element or intermediate element than those previously described on the shelf according to the invention, it being possible for example for these elements to comprise plastic parts (or to consist of one or more plastics and/or metal) or parts incorporated into the plastic structure.

BRIEF DESCRIPTION OF THE DRAWINGS

Other characteristics and advantages of the invention will become apparent from the description hereinafter of some nonlimiting embodiments of the invention with reference to the appended drawings in which:

FIG. 1 depicts a partial schematic view in exploded perspective of a shelf according to the invention and of assembly elements according to the invention for fixing it to the rear wall of a refrigerator;

FIG. 2 depicts a partial schematic view in section of the shelf before and after the shrinking of the frame;

FIG. 3 depicts the shelf of FIG. 1 turned over (seen schematically from beneath) in perspective;

DETAILED DESCRIPTION OF THE PREFERRED EMBODIMENT

Figure 4:
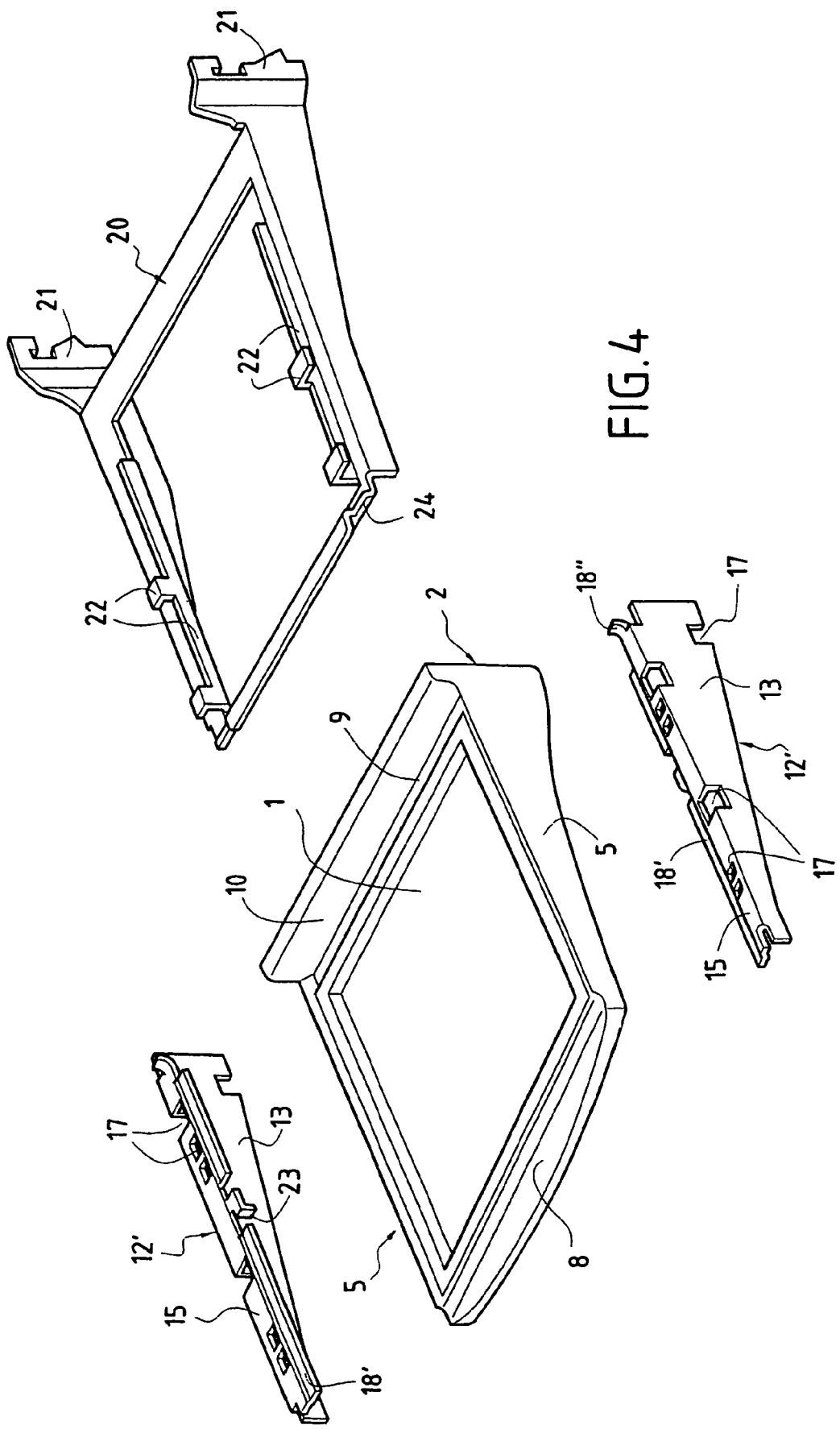
FIG. 4 depicts a partial schematic view in exploded perspective of a similar shelf this time with assembly elements and the associated runner for attaching it, in a sliding version, to the rear wall of a refrigerator.

The shelf described in FIGS. 1 to 4 is designed in particular for supporting articles in a refrigerator (shown schematically at 200) and comprises a glass panel 1 (possibly with an enameled edging to conceal the join with the plastic structure, the side walls also possibly concealing this join via the shadow they cast), equipped with a structure (or surround or frame) made of polypropylene 2. This assembly is obtained as follows: polypropylene granules (preferably filled with talc to improve the mechanical strength of the polypropylene) are heated in a plasticizing chamber of an injection-molding machine to a temperature that is high enough that the plastic can be injected and the molten material is injected into the mold or injection-molding machine to obtain the semifinished product which, through the shrinkage of the plastic, will yield the structure 2. The material cools in the mold and solidifies from 160° C. in the form of a semicrystalline product. When the mold is open to remove the molded frame, the plastic reaches about 70° C. The shrinkage of the plastic then begins to occur to a significant extent. In the 4 minutes (and preferably in the 1 to 2 minutes) following removal from the mold, the surface 4 of the frame on which surface the panel is to rest possibly undergoes a surface treatment (for example of the plasma type), is preferably coated with adhesive (it being possible for handling to be automated) using an elastic adhesive 100 (a channel--not depicted--may possibly be provided to accommodate the adhesive on the surface) and the glass panel is placed on the frame (position a of the frame depicted in fine and dotted line in FIG. 2). Shrinkage then continues to occur (about 75% of the shrinkage takes place in the first 15 minutes, it being possible for final shrinkage to take several hours) until the frame reaches its definitive shape (position b of the frame depicted in thick line in FIG. 2). In this state, the frame mates with and mechanically holds the glass on its edge 3, with a compressive force of the order, for example, of 9 MPa exerted on the edge of the glass, optionally with the aid of clips 300. In a frame of the order of 420 mm wide, the final shrinkage may, for polypropylene, be as much as 4 mm. The assembly obtained is particularly robust and meets the safety standards.

The frame here comprises a supporting surface 4 in the form of a frame, two lateral walls 5 with an upper part 6 forming a small rim protruding from the top face of the panel and a lower part 7 under the underside of the panel, a front extension 8 forming a handle for handling the shelf, a rear extension possibly with a channel 9 for collecting or removing liquids in the event of a spillage on the shelf, and with an upstand 10 to prevent items from coming into contact with the rear wall of the refrigerator.

The frame may also be equipped with catching (and/or retaining and/or locking) means 11 (as illustrated in FIG. 3) in the form of lugs, protrusions, clips, stops, etc., making it possible, for example, for assembly elements 12 (FIG. 1) or 12' (FIG. 4) to be mounted. These elements, for example metal plates obtained by stamping, have a first part (or leg) 13 equipped initially at one of its end with a hook 14 for mounting on rails provided on the rear wall of the refrigerated compartment (this hook being cut off for the sliding version depicted in FIG. 4), a second part 15 which is bent with respect to the first (the entity having an L-shaped cross section), the first part being clipped onto the internal wall 16 of the lower part of a lateral wall 5 of the frame, the second part being clipped under the supporting surface 4, clipping (or fixing or imbrication) of the assembly elements with the frame being achieved using means that complement those provided on the frame (in this case in particular recesses 17), and a third part 18, 18' which is either bent (FIG. 1) with respect to the second part so as to follow the contours of the supporting surface (for example covering part of its thickness 19) or fashioned so that it forms a runner (FIG. 4), it being possible for this bending into the chosen configuration to be done at the last minute. In this latter sliding version, it is also possible to provide a part 18" or lug butting against the thickness of the supporting surface of the frame, the fact of bordering the frame in three directions or parts making the entity more secure.

In this instance, the shelf gets at least two assembly elements, each element being mounted under one of the lateral walls of the shelf, for example after storage and possible drying of the shelf obtained as described previously and depending on the desired method of attachment.

In the sliding version illustrated in FIG. 4, use is also made of a metal support 20 or runner, formed as a single piece for example by stamping and equipped with hooks 21 for fixing it to the rear wall of a refrigerator, and having surfaces 22 or runners intended to collaborate with the corresponding runners 18' of the assembly elements to allow the shelf to slide. Stops 23, 24 may be provided on the assembly elements and the sliding support to arrest the movement of the shelf in mid-travel for safety reasons.

The shelf described earlier may be considered as simply being formed of the panel and of the frame (the frame possibly being fashioned in such a way that it can be slid by its sides in the lateral runners of a refrigerator) or may be considered as being equipped with the assembly elements, or even with the previously mentioned additional frame.

The shelf according to the invention is particularly well suited to the supporting of items and elements in a refrigerated compartment or a refrigerator (a refrigerator equipped with the present shelf also being something at which the invention is aimed) but may also be suitable for supporting other types of items in other types of unit.

What is claimed is:

1. A shelf, comprising:
   at least one panel; and
   at least one attached unitary plastic structure which permanently fixedly surrounds the entire periphery of said panel and permanently fixedly mates with at least one edge of said panel, said structure having a perimeter shrunk-fit around a perimeter of the panel to provide a lateral pressure of from 5-15 MPa compressing the edge of the panel,
   wherein said shelf is obtained by shrinking said at least one attached plastic structure after the at least one panel and the at least one attached plastic structure have been assembled.

2. A shelf as claimed in claim 1, wherein the at least one attached plastic structure is formed with at least first and second plastics, the first plastic being more flexible than the second plastic and configured to be in contact with the at least one panel and at least partly covering the second plastic that is more rigid than the first plastic.

3. The shelf as claimed in claim 1, further comprising at least one of an elastic adhesive and at least one flexible insulating gasket.

4. A shelf as claimed in claim 1, further comprising at least one assembly element having at least a first part clipped under the at least one panel against a vertical wall of the at least one attached plastic structure, a second part clipped under the at least one attached plastic structure, and a third part bent to border another part of the shelf or to form a runner configured to collaborate for cantilever mounting in a unit.

5. A shelf as claimed in claim 1, and which slides with respect to a support formed as a single piece.

6. A shelf as claimed in claim 1, wherein the at least one panel and the at least one attached plastic structure are molded.

7. A refrigerator comprising at least one shelf as claimed in claim 1.

* * * * *